United States Patent
Han et al.

(10) Patent No.: US 10,042,228 B2
(45) Date of Patent: Aug. 7, 2018

(54) ARRAY SUBSTRATE, LIQUID CRYSTAL PANEL AND DISPLAY DEVICE

(71) Applicants: Boe Technology Group Co., Ltd., Beijing (CN); Beijing Boe Optoelectronics Technology Co., Ltd., Beijing (CN)

(72) Inventors: Shuai Han, Beijing (CN); Jian Wang, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 141 days.

(21) Appl. No.: 14/913,275

(22) PCT Filed: Sep. 2, 2015

(86) PCT No.: PCT/CN2015/088826
§ 371 (c)(1),
(2) Date: Feb. 19, 2016

(87) PCT Pub. No.: WO2016/150106
PCT Pub. Date: Sep. 29, 2016

(65) Prior Publication Data
US 2017/0038613 A1    Feb. 9, 2017

(30) Foreign Application Priority Data

Mar. 26, 2015   (CN) .......................... 2015 1 0137036

(51) Int. Cl.
*G02F 1/137*      (2006.01)
*G02F 1/1337*     (2006.01)
(Continued)

(52) U.S. Cl.
CPC ............ *G02F 1/137* (2013.01); *G02F 1/1368* (2013.01); *G02F 1/13439* (2013.01);
(Continued)

(58) Field of Classification Search
None
See application file for complete search history.

(56) References Cited

U.S. PATENT DOCUMENTS 5,682,211 A * 10/1997 Yao .................... G02F 1/136209
                                                        349/38
9,304,369 B2 * 4/2016 Nakamura .............. G02F 1/172
(Continued)

FOREIGN PATENT DOCUMENTS

CN       102156369        8/2011
CN       102466934        5/2012
(Continued)

OTHER PUBLICATIONS

International Search Report and Written Opinion from PCT/CN15/88826 dated Jan. 7, 2016.
(Continued)

*Primary Examiner* — Ryan Crockett
(74) *Attorney, Agent, or Firm* — Calfee, Halter & Griswold LLP

(57) ABSTRACT

The present invention discloses an array substrate, a liquid crystal panel and a display device. The array substrate comprises a plurality of pixel units arranged in array and delimited by a plurality of gate lines and a plurality of data lines cross each other, each pixel unit comprising a thin film transistor, a plate electrode and a slit electrode located above the plate electrode. The slit electrode comprises a plurality of electrode strips and a slit is formed between adjacent electrode strips. Two ends of each slit of the slit electrode both have a turning. The design of turning can increase the
(Continued)

intensity of the electric field that controls deflection of the liquid crystal molecules. When the picture content displayed by the display device is switched, most liquid crystal molecules can be deflected quickly, thereby enabling the light effect to be increased and the dark area weakened.

16 Claims, 4 Drawing Sheets

(51) Int. Cl.
    *G02F 1/1343*     (2006.01)
    *G02F 1/1362*     (2006.01)
    *G02F 1/1368*     (2006.01)
    *G02F 1/1335*     (2006.01)
    *G02F 1/1333*     (2006.01)

(52) U.S. Cl.
    CPC .. *G02F 1/133707* (2013.01); *G02F 1/134309* (2013.01); *G02F 1/134336* (2013.01); *G02F 1/136286* (2013.01); *G02F 1/133512* (2013.01); *G02F 2001/133397* (2013.01)

(56) References Cited

U.S. PATENT DOCUMENTS

| | | | |
|---|---|---|---|
| 2003/0112383 A1* | 6/2003 | Kim | G02F 1/13458 349/43 |
| 2005/0162580 A1* | 7/2005 | Kim | G02F 1/136227 349/43 |
| 2008/0204613 A1* | 8/2008 | Kim | G02F 1/133707 349/33 |
| 2009/0174635 A1* | 7/2009 | Na | G02F 1/133707 345/87 |
| 2009/0225267 A1* | 9/2009 | Atarashiya | G02F 1/134363 349/139 |
| 2012/0127409 A1* | 5/2012 | Imayama | G02F 1/1368 349/133 |
| 2014/0028943 A1* | 1/2014 | Imayama | G02F 1/134363 349/43 |
| 2014/0152934 A1* | 6/2014 | Huh | G02F 1/133707 349/43 |
| 2015/0035741 A1* | 2/2015 | Lee | G02F 1/136227 345/103 |
| 2016/0252793 A1* | 9/2016 | Cheng | G02F 1/1362 257/72 |

FOREIGN PATENT DOCUMENTS

| | | |
|---|---|---|
| CN | 102629038 | 8/2012 |
| CN | 103529602 A | 1/2014 |
| CN | 103852942 | 6/2014 |
| CN | 103941485 | 7/2014 |
| CN | 203941365 U | 11/2014 |
| CN | 104317115 | 1/2015 |
| CN | 104698696 | 6/2015 |
| KR | 20130009517 | 1/2013 |

OTHER PUBLICATIONS

Office Action from China Application No. 201510137036.9 dated Jan. 25, 2017.
Second Office Action from China Application No. 201510137036.9 dated Jul. 17, 2017.
Text of the Decision of Rejection for China Application No. 201510137036.9 dated Dec. 27, 2017.

* cited by examiner

ARRAY SUBSTRATE, LIQUID CRYSTAL PANEL AND DISPLAY DEVICE

RELATED APPLICATIONS

The present application is the U.S. national phase entry of PCT/CN2015/088826 with an International filing date of Sep. 2, 2015, which claims the benefit of Chinese Application No. 20151037036.9, filed Mar. 26, 2015, the entire disclosures of which are incorporated herein by reference.

FIELD OF THE INVENTION

The present invention relates to the field of display technology, particularly to an array substrate, a liquid crystal panel and a display device.

BACKGROUND OF THE INVENTION

In a panel display device, the thin film transistor liquid crystal display (TFT-LCD) has the characteristics of small volume, low power consumption, relatively low manufacturing cost and free of radiation, and occupies a leading position in the panel display market.

At present, the display modes of the TFT-LCD mainly include Twisted Nematic (TN) mode, Vertical Alignment (VA) mode, In-Plane-Switching (IPS) mode and ADvanced Super Dimension Switch (AD-SDS, in short ADS) mode etc.

The ADS-mode based display forms a multi-dimensional electric field through the electric field generated at the edge of the slit electrode in the same plane and the electric field generated between the slit electrode and a plate electrode, so as to enable the oriented liquid crystal molecules between the slit electrodes and exactly above the electrodes within the liquid crystal cell to rotate, thereby improving the liquid crystal working efficiency and increasing the light transmission efficiency. The ADS technology can improve the image quality of the TFT-LCD product, and has the advantages of high resolution, high transmittance, low power consumption, wide visual angle, high aperture ratio, low chromatic aberration, free of push Mura etc.

The ADS-mode based array substrate generally comprises a plurality of pixel units arranged in array, each pixel unit comprising a thin film transistor, a plate electrode and a slit electrode located above the plate electrode. The slit electrode comprises a plurality of electrode strips, and forming a slit between adjacent electrode strips.

FIG. 1a is a schematic view of liquid crystal molecule deflection and simulated light effect of a slit area at the lower right (wherein the gate line connected to the pixel unit is located below the pixel unit, and the data line connected to the pixel unit is located at the right side of the pixel unit) of a pixel unit in the prior art; FIG. 1b is a sectional schematic view of the slit area at the lower right of the pixel unit as shown in FIG. 1a; FIG. 1c is an actual lighting view of a pixel unit in the prior art. As shown in FIG. 1a and FIG. 1b, when the existing ADS-mode based display device performs display, since this part of slit has a relatively large width, the anchoring force of the electric field to the liquid crystal molecules at certain positions is relatively weak. If the picture content displayed by the display device is switched, the deflection angle of the liquid crystal molecules at these positions will be relatively small, thereby generating a dark area. In addition, as shown in FIG. 1c, when the pixel unit in the prior art is in actual lighting, the dark area will move a relatively large displacement along the rubbing direction of the liquid crystal molecules, thereby being unable to be shielded by a black matrix. Macroscopically, an afterimage will be seen on the screen of the display device, which may significantly influence the user's visual experience.

SUMMARY OF THE INVENTION

An object of the embodiments of the present invention is to provide an array substrate, a liquid crystal panel and a display device, so as to improve the afterimage phenomenon of the display device and enhance the display quality of the display device.

An embodiment of the present invention provides an array substrate comprising a plurality of pixel units arranged in array and delimited by a plurality of gate lines and a plurality of data lines cross each other, each pixel unit comprising a thin film transistor, a plate electrode and a slit electrode located above the plate electrode, the slit electrode comprising a plurality of electrode strips and forming a slit between adjacent electrode strips, wherein two ends of each slit of the slit electrode both have a turning.

In some embodiments, two ends of each slit of the slit electrode both have a turning. The design of the turning shape can increase the intensity of the electric field that controls the deflection of the liquid crystal molecules. When the picture content displayed by the display device is switched, most liquid crystal molecules can be deflected quickly, thereby enabling the light effect to be increased and the dark area weakened. Moreover, since the dark area will not displace, it can be designed to be shielded by a black matrix, thus the dark area is invisible macroscopically. By means of this solution, the afterimage phenomenon of the display device can be improved significantly, and the display quality of the display device can be enhanced.

According to an embodiment, in one pixel unit, a turning of each slit close to a gate line connected to the pixel unit faces towards a data line connected to the pixel unit, while a turning away from the gate line is back on to the data line. By using this structure design, the deflection directions of the liquid crystal molecules in the opening area of the pixel unit are substantially the same, the arrangement of the liquid crystal molecules are relatively regular.

According to an embodiment, an angle of the turning is between 30 degrees and 60 degrees.

According to an embodiment, the angle of the turning is 45 degrees.

According to an embodiment, in the slit electrode, an electrode strip located at the boundary of the pixel unit covers the data line, and a distance from each side of the electrode strip located at the boundary of the pixel unit to a corresponding side of the data line is ≥3.0 microns.

According to an embodiment, the width of the slit is ≥3.6 microns.

An embodiment of the present invention further provides a liquid crystal panel comprising an array substrate as stated in any of the preceding embodiments. If this liquid crystal panel is applied into the display device, the afterimage phenomenon can be improved significantly, thereby enabling the display device to have a better display quality.

An embodiment of the present invention further provides a display device comprising a liquid crystal panel as stated in the preceding embodiment. The display device can improve the afterimage phenomenon effectively and has a relatively high display quality.

BRIEF DESCRIPTION OF THE DRAWINGS

FIG. 1b is a sectional schematic view of the slit area of the pixel unit as shown in FIG. 1a;

FIG. 3b is a sectional schematic view of the slit area of the pixel unit as shown in FIG. 3a;

REFERENCE SIGNS

1—gate line;
2—data line;
3—plate electrode;
4—slit electrode;
5—electrode strip;
6—slit;
7—dark area;
8—turning;
10—thin film transistor.

DETAILED DESCRIPTION OF THE INVENTION

In order to improve the afterimage phenomenon of the display device and enhance the display quality of the display device, the embodiments of the present invention provide an array substrate, a liquid crystal panel and a display device. In order to make the objects, the technical solutions and the advantages of the present invention clearer, the present invention will be explained in more details through specific embodiments in the following.

Figure 2A:
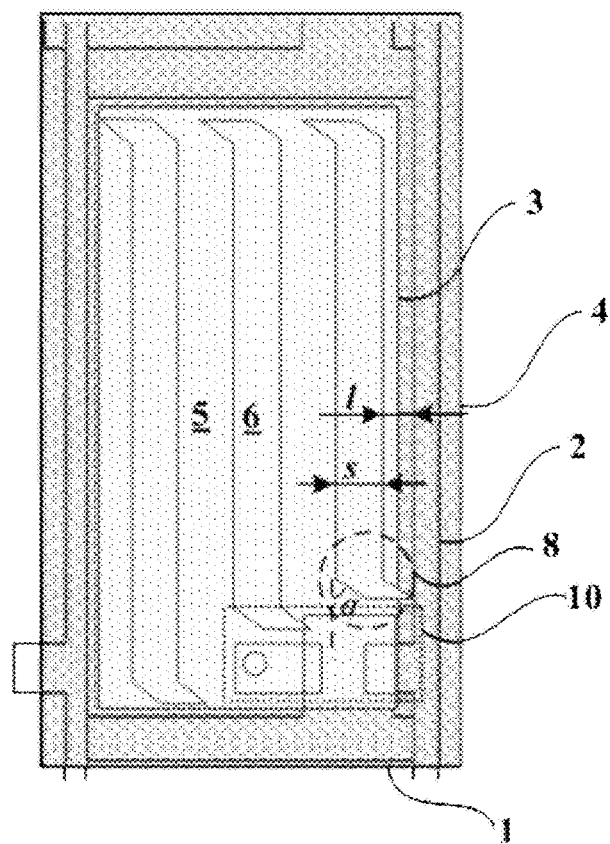
FIG. 2a is a pixel structure schematic view of an array substrate according to an embodiment of the present invention.
Figure 2B:
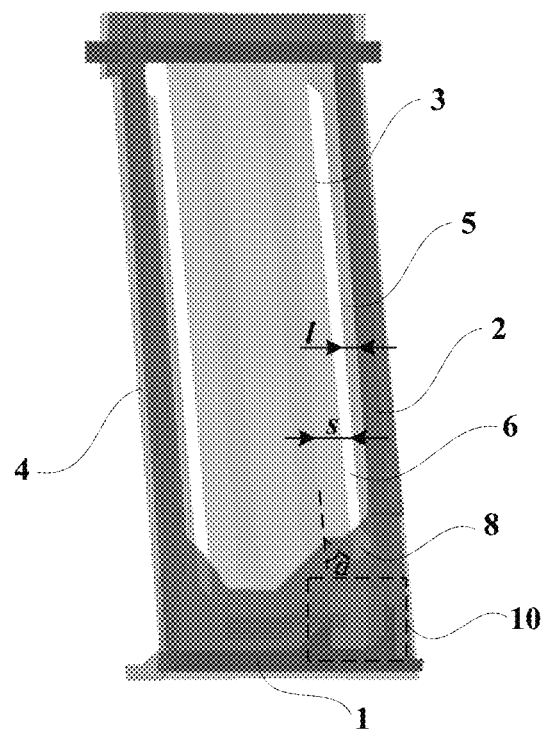
FIG. 2b is a pixel structure schematic view of an array substrate according to another embodiment of the present invention.
Figure 3A:
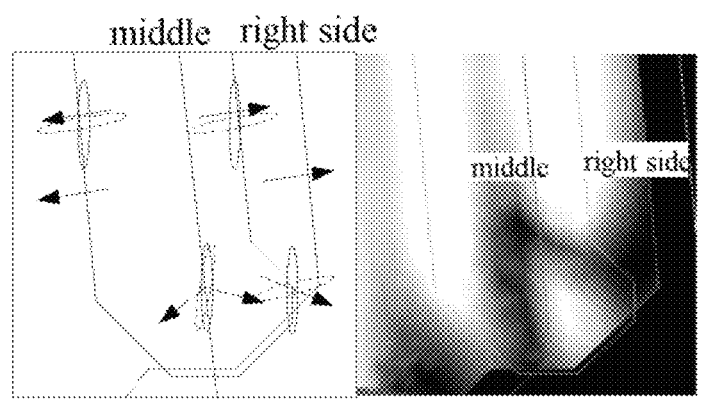
FIG. 3a is a schematic view of liquid crystal molecule deflection and simulated light effect of a slit area of a pixel unit in an embodiment of the present invention.
Figure 3B:
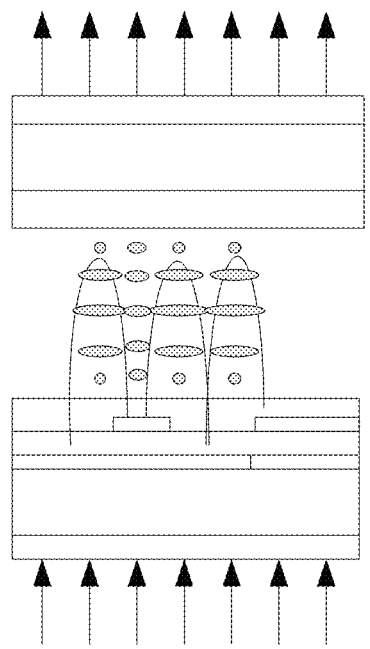
Figure 3C:
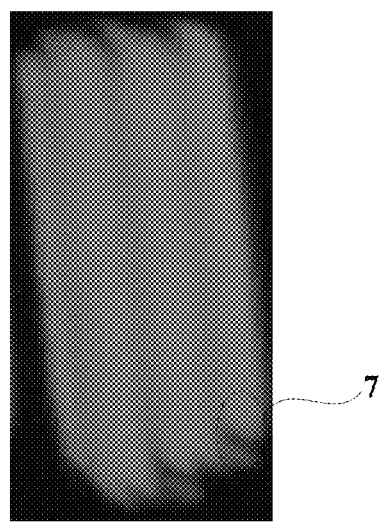
FIG. 3c is an actual lighting view of a pixel unit in an embodiment of the present invention.

FIG. 2a is a pixel structure schematic view of an array substrate according to an embodiment of the present invention; FIG. 2b is a pixel structure schematic view of an array substrate according to another embodiment of the present invention; FIG. 3a is a schematic view of liquid crystal molecule deflection and simulated light effect of a slit area of a pixel unit in an embodiment of the present invention; FIG. 3b is a sectional schematic view of the slit area of the pixel unit as shown in FIG. 3a; FIG. 3c is an actual lighting view of a pixel unit in an embodiment of the present invention.

The array substrate provided by an embodiment of the present invention comprises a plurality of pixel units arranged in array and delimited by a plurality of gate lines 1 and a plurality of data lines 2 cross each other, as shown in FIG. 2a and FIG. 2b. Each pixel unit comprises a thin film transistor 10, a plate electrode 3 and a slit electrode 4 located above the plate electrode 3. The slit electrode 4 comprises a plurality of electrode strips 5 and a slit 6 is formed between adjacent electrode strips 5. Two ends of each slit 6 of the slit electrode 4 both have a turning 8.

Generally on the array substrate, a group of gate lines are arranged along a first direction (e.g. the row direction), and a group of data lines are arranged along a second direction (e.g. the column direction). The respective gate lines and respective data lines cross each other thereby delimiting a plurality of pixel units arranged in array. Specifically, in each pixel unit, the gate of the thin film transistor is connected with one of the respective gate lines, the source of the thin film transistor is connected with one of the respective data lines, and the drain of the thin film transistor is connected with the plate electrode. In the following embodiments of the present invention, the thin film transistor 10, the plate electrode 3 and the slit electrode 4 and so on mentioned are all with respect to the same pixel unit, moreover, the gate line 1 and the data line 2 mentioned are both gate line and data line connected to the pixel unit.

Figure 1A:
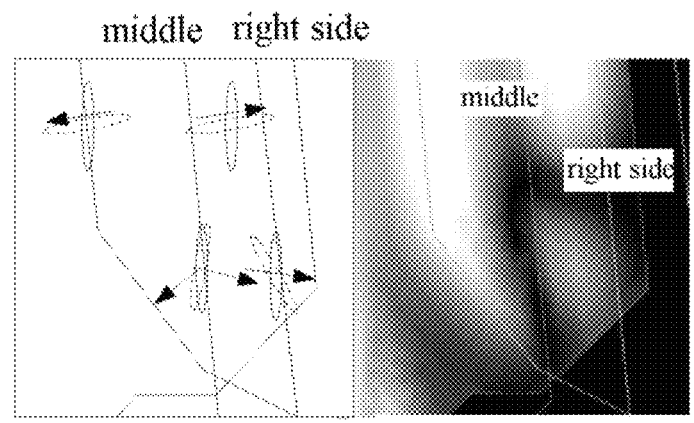
FIG. 1a is a schematic view of liquid crystal molecule deflection and simulated light effect of a slit area of a pixel unit in the prior art.

Referring to FIG. 1a, in the prior art, after the liquid crystal panel is powered on, at one end of the slit close to the data line which is close to the gate line (which is shown in the figure as being located at the lower right of the pixel unit), the liquid crystal molecules in the middle area thereof are driven by electric fields of different directions, hence, they are hardly deflected, a dark area will be generated; since the right area thereof is relatively close to the middle area, the liquid crystal molecules are also greatly interfered by the electric field of reverse direction, hence, the deflection of the liquid crystal molecules is also relatively small, thereby generating a short dark area.

Referring to FIG. 3a, after the pixel structure of the embodiment of the present invention is adopted, the slit close to the data line has a turning at one end close to the gate line, such that the area in the slit that is driven by electric field of different directions is correspondingly reduced, thereby enabling the deflection of the liquid crystal molecules to be increased, hence, the dark area of the middle area is weakened. In addition, since the slit close to the data line has a turning at one end close to the gate line, the right area is increased, such that the liquid crystal molecules of the right side area is less interferred by the electric field of reverse direction, the deflection is increased, thereby weakening the short dark area.

Figure 1B:
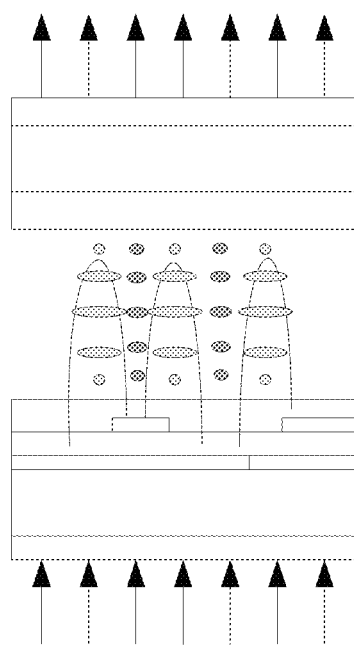
Figure 1C:
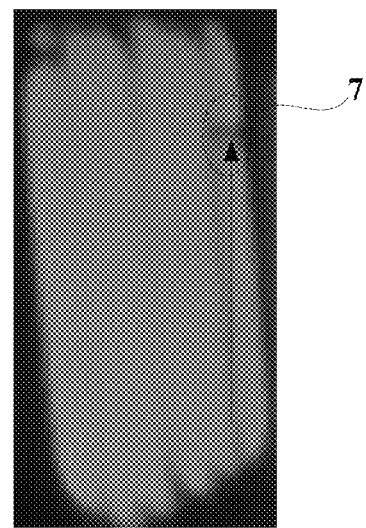
FIG. 1c is an actual lighting view of a pixel unit in the prior art.

It can also be seen from comparison of FIG. 1b and FIG. 3b that after the pixel structure of the embodiment of the present invention is adopted, the distance between the electrode strips is reduced, thereby enabling the intensity of the electric field in this area to be increased, the anchoring force to the liquid crystal molecules is enhanced, thereby increasing the deflection angle of the liquid crystal molecules.

The array substrate of this embodiment is applied into a liquid crystal panel, after the liquid crystal panel is powered on, the intensity of the electric field in the area of one end of the slit close to the data line which is close to the gate line (which is shown in the figure as being located at the lower right of the pixel unit) is enhanced, hence, the anchoring force to the liquid crystal molecules is enhanced. When the picture content displayed by the display device is switched, most liquid crystal molecules can be deflected quickly, thereby enabling the light effect to be increased and the dark area weakened. Moreover, since the dark area will not displace, it can be designed to be shielded by a black matrix, thus the dark area is invisible macroscopically. By means of the embodiment of the present invention, the afterimage phenomenon of the display device can be improved significantly, and the display quality of the display device can be enhanced.

In addition, the weakening of the dark area is also benefit for reducing the line width of the black matrix, thereby being in favor of increasing the aperture ratio of the pixel unit (the aperture ratio of the pixel unit refers to the ratio that the pixel light emitting area occupies the pixel area, which is the main factor that determines the transmissivity of the pixel unit), so as to improve the transmissivity of the liquid crystal panel.

As shown in FIG. 3c, after the structure of the above embodiment is adopted, the dark area 7 of the pixel unit is shortened and weakened, moreover, the dark area 7 will not displace either, it can be designed to be shielded by the black matrix (the black matrix is not shown in the figure), hence, the afterimage phenomenon of the display device can be improved significantly, and the display quality of the display device can be enhanced.

Please continue to refer to FIG. 2a and FIG. 2b, the turning 8 close to the gate line 1 faces towards the data line 2, the turning 8 away from the gate line 1 is back on to the data line 2. By using this structure design, the deflection directions of the liquid crystal molecules in the opening area of the pixel unit are substantially the same, the arrangement of the liquid crystal molecules is relatively regular.

The inventor of the present application finds after large amount of experiments that, in the pixel structure of the array substrate, if the angle α of the turning 8 is designed to be 30 degrees~60 degrees, the arrangement of the liquid crystal molecules can be more ordered and regular. Preferably, the effect is optimal if the angle of the turning is designed to be 45 degrees. In the slit electrode 4, the electrode strip at the boundary of the pixel unit covers the data line 2, and a distance/from each side of the electrode strip located at the boundary of the pixel unit to a corresponding side of the data line 2 is ≥3 microns, in this way, the influence of the data line 2 to the electric field in the slit can be reduced. The slit widths of the slit electrode 4 is ≥3 microns. Through the above design, the dark area can be weakened to a relatively great extent, the afterimage phenomenon can be improved so as to make the display quality of the display device better.

An embodiment of the present invention further provides a liquid crystal panel comprising an array substrarte according to any of the embodiments of the present invention. By applying the liquid crystal panel into a display device, the afterimage phenomenon can be improved significantly, thereby enabling the display device to have a better display quality.

An embodiment of the present invention further provides a display device comprising a liquid crystal panel according to the embodiment of the present invention. The display device can improve the afterimage phenomenon effectively and has a relatively high display quality.

Apparently, the skilled person in the art can make various modifications and variations to the present invention without departing from the spirit and scope of the present invention. In this way, provided that these modifications and variations of the present invention belong to the scopes of the claims of the present invention and the equivalent technologies thereof, the present invention also intends to cover these modifications and variations.

The invention claimed is:

1. An array substrate comprising a plurality of pixel units arranged in array and delimited by a plurality of gate lines and a plurality of data lines that cross each other, each pixel unit comprising a thin film transistor, a plate electrode and a slit electrode located above the plate electrode, the slit electrode comprising a plurality of electrode strips and forming a slit between adjacent electrode strips, wherein:

two ends of each slit of the slit electrode both have a turning, and in the slit electrode, an electrode strip located at the boundary of the pixel unit completely covers the data line, the width of the electrode strip located at the boundary of the pixel unit is larger than the width of the data line, and a distance from each side of the electrode strip located at the boundary of the pixel unit to a corresponding side of the data line is ≥3.0 microns.

2. The array substrate as claimed in claim 1, wherein an angle of the turning is between 30 degrees and 60 degrees.

3. The array substrate as claimed in 2, wherein the angle of the turning is 45 degrees.

4. The array substrate as claimed in claim 1, wherein the width of the slit is ≥3.6 microns.

5. The array substrate as claimed in claim, 1 wherein in one pixel unit, a turning of each slit close to a gate line connected to the pixel unit faces towards a data line connected to the pixel unit, while a turning away from the gate line is back on to the data line.

6. The array substrate as claimed in claim 5, wherein an angle of the turning is between 30 degrees and 60 degrees.

7. The array substrate as claimed in claim 6, wherein the angle of the turning is 45 degrees.

8. The array substrate as claimed in claim 5, wherein the width of the slit is ≥3.6 microns.

9. A liquid crystal panel, comprising: the array substrate as claimed in claim 1.

10. The liquid crystal panel as claimed in claim 9, wherein in one pixel unit, a turning of each slit close to a gate line connected to the pixel unit faces towards a data line connected to the pixel unit, while a turning away from the gate line is back on to the data line.

11. The liquid crystal panel as claimed in claim 9, wherein an angle of the turning is between 30 degrees and 60 degrees.

12. The liquid crystal panel as claimed in claim 11, wherein the angle of the turning is 45 degrees.

13. The liquid crystal panel as claimed in claim 9, wherein the width of the slit is ≥3.6 microns.

14. A display device, comprising the liquid crystal panel as claimed in claim 9.

15. The display device as claimed in claim 14, wherein in one pixel unit, a turning of each slit close to a gate line connected to the pixel unit faces towards a data line connected to the pixel unit, while a turning away from the gate line is back on to the data line.

16. The liquid crystal panel as claimed in claim 14, wherein an angle of the turning is between 30 degrees and 60 degrees.

* * * * *